Nov. 21, 1939.   R. E. PECK   2,180,644
CONDUIT CONSTRUCTION
Filed June 11, 1936
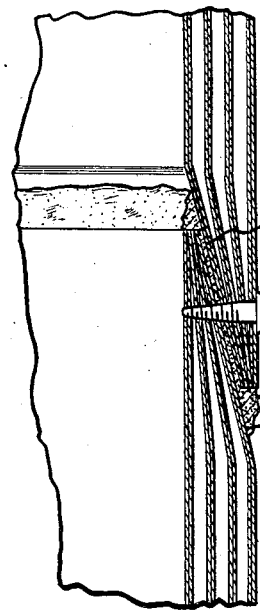
FIG. 3.
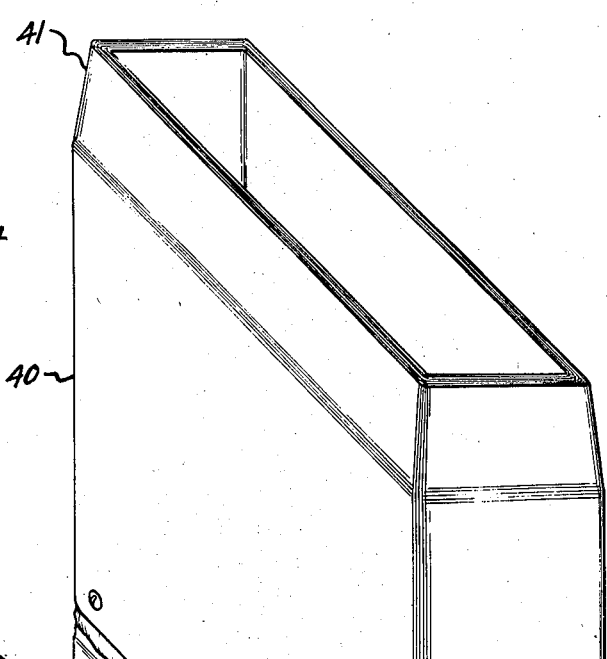
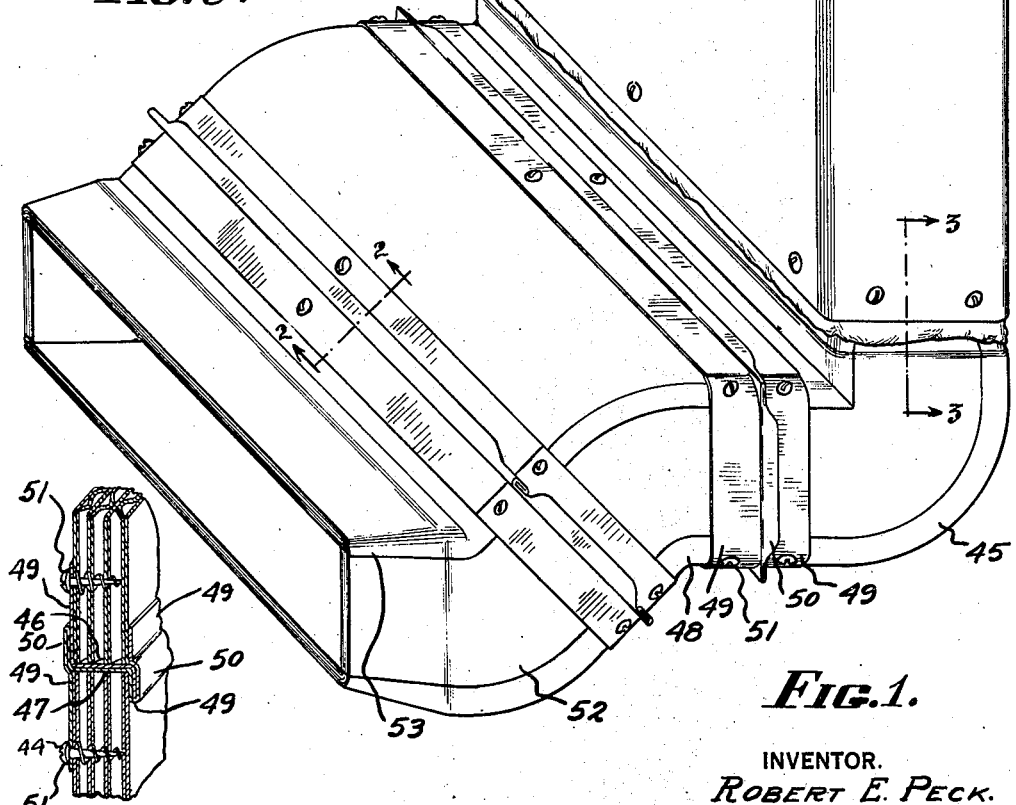
FIG. 2.
FIG. 1.
INVENTOR.
ROBERT E. PECK.
BY *Allen & Allen*
ATTORNEYS.

Patented Nov. 21, 1939

2,180,644

UNITED STATES PATENT OFFICE 2,180,644

CONDUIT CONSTRUCTION

Robert E. Peck, Cincinnati, Ohio, assignor, by direct and mesne assignments, of nine-twentieths to William Burchenal, and one-twentieth to Morss Lippincott, both of Cincinnati, Ohio Application June 11, 1936, Serial No. 84,729

1 Claim. (Cl. 285—117)

My invention relates to the art of conduit construction in which the walls of the conduit have insulative properties to prevent heat transfer between the air or gases within the conduit and the air surrounding the conduit.

It is the object of my invention to provide conduit construction composed of laminations of lengthwise corrugated fibrous material which is spun on a form or molded into form sustaining rectangular-shaped sections which do not depend for strength on any alternating position of corrugations or on metallic edge strengtheners. My invention further contemplates the arrangement of the corrugations of all sides extending in alignment with the length of the sections, which obviates any difficulties in spinning or forming the corners of the conduit sections.

The foregoing objects and other objects to which reference will be made in the ensuing description, I accomplish by the use of a constructive principle of which I have depicted a preferred, typical construction, so as to enable others skilled in the art to fully apprehend the underlying feature of my invention in the various ways contemplated thereby.

Referring to the drawing:

Fig. 1 is a perspective view of a portion of conduit installation.

Fig. 2 is a sectional view taken along the lines 2—2 in Fig. 1.

Fig. 3 is a sectional view taken along the lines 3—3 in Fig. 1.

Referring now to Fig. 1, I have illustrated a completed section of duct material at 40. The upper edge of the duct section has been softened, and by inserting the section within a form and compressing the edge portion inwardly, a coupling joint 41 is formed at one end, in which the fibrous duct material is beveled inwardly, as illustrated, from the plane of the outer surface of the duct. The lower end has been softened and compressed outwardly so that the bevel extends from the inner surface of the duct section to the narrowed, lower edge, substantially as illustrated at 42. Thus in the sectional view in Fig. 3, a preferred type of joint is shown. The beveled edge 42 causes a very firm compression of the material. The outwardly beveled portion 42 registers with the inwardly beveled edge 41 connecting portion of another section of duct material. Cement, as illustrated at 43, is spread over the meeting surfaces of the joint, and metal screws 44, or other suitable fasteners, are inserted through the duct material and form a good, solid joint, which is particularly permanent because the material has a minimum of expansion and contraction, due to temperature, which obviates relative movement of the various parts forming the joint, due to variations in temperature. The metal screws 44, I find to be particularly effective for securing a binding grip in the duct material.

After the elbow connections are formed, their open ends may be compressed as desired to form connections with either straight sections of duct material, or other elbows. In some cases, the edges of the elbows may be beveled inwardly. In other cases, the edges may be beveled outwardly, and in still other instances, the one or both edges may be left unbeveled. Thus in Fig. 1, the duct section 40 is connected with a ninety-degree elbow 45, which has one end beveled inwardly to register with the outwardly beveled end of the straight duct section. The end of the ninety-degree elbow opposite the joint with the straight section 40 is non-compressed, as indicated at 46, and it joins the non-compressed end 47 to a forty-five degree angle section 48, which has neither of its edges beveled.

For joining the unbeveled edges 46, 47 of the elbow section, I have shown metal channel connectors having channel portions 49, which engage the ends of the elbow sections. The connectors 49 have extensions 50, which, when the sections are placed together, can be hammered down into the position illustrated, forming a secure joint, which resists lateral displacement. The connectors are held against lengthwise displacement by means of metal screws 51, which are extended through the metal channels and seat in the fiber of the duct material.

At 52 there is illustrated another forty-five degree elbow, in which one end has an unbeveled edge, but in which the other end is beveled from the outer surface inwardly, as indicated at 53, to register with a flat duct section, having an edge beveled outwardly, as indicated at 42, in the straight duct section 40.

The bending of the corners and the beveling of the end edges, either before or after a silicate treatment, causes a difference in tension of the stock, which reinforces the corners, and makes the sections very strong and rigid.

For satisfactory work in conduit construction, the fibrous air cell, insulative material should resist a dead load crushing strain test of over 20 lbs. to the square inch, the test being made with a six inch square piece on a flat surface. In the treatment of the material with the silicate solution, the extent of the treatment should be sufficient to impart to the finished product a resistance to a dead load crushing strain of substantially at least the extent noted.

The coating should further render the surfaces of the conduit material water and substantially fire-proof, and while silicate makes an adequate coating, other materials may be used.

The duct material which I have illustrated is spun or formed from corrugated, fibrous material. However, other embossed forms of fibrous material, which provide an analogous air cell construction, may be employed, the particular required properties of the material being the capability of self-sustaining support to the extent suggested, combined with insulating efficiency, and having non-vibrating properties.

Having thus described my invention, what I claim as new and desire to secure by Letters Patent is:

Conduit construction composed of spun rectangular sections of air cell, fibrous, non-inflammable material, having compressed end edge connecting portions, and cement forming a bond between edge connections with metal screws extending through said connecting portions.

ROBERT E. PECK.